United States Patent [19]

Williams

[11] 3,891,920
[45] June 24, 1975

[54] SCANNING MIXED BASE RECEIVER
[75] Inventor: Richard E. Williams, Fairfax, Va.
[73] Assignee: Melphor Inc., Falls Church, Va.
[22] Filed: June 26, 1957
[21] Appl. No.: 668,255

[52] U.S. Cl. ............................ 324/77 B; 324/78 R
[51] Int. Cl. .............................................. G01r 23/14
[58] Field of Search ............ 324/78, 79, 77 B, 77 C, 324/78 R, 77; 250/30–35, 20–41 Z

[56] References Cited
UNITED STATES PATENTS
2,525,679   10/1950   Hurvitz ............................ 324/77 C Primary Examiner—Maynard R. Wilbur
Assistant Examiner—Richard E. Berger
Attorney, Agent, or Firm—Hyman Hurvitz

EXEMPLARY CLAIM

1. A system of frequency measuring comprising a first frequency scanning system for capturing a predetermined frequency at a time within a first time interval wherein said time is a function of said frequency, and a second predetermined frequency scanning system for capturing said predetermined frequency at a time within a second time interval which is a function of said predetermined frequency, and means for indicating the value of said predetermined frequency as a function of the difference of said times.

12 Claims, 4 Drawing Figures

3,891,920

Richard E Williams
INVENTOR

W. Robert Baylor
Hyman Hurwitz
BY                ATTORNEYS

SCANNING MIXED BASE RECEIVER

The present invention relates generally to systems for measuring frequency and more particularly to frequency measuring systems which employ frequency scanning techniques involving reduced times of scan to survey a predetermined frequency band, whereby to assure capture of a single pulse of short duration within the band.

The conventional technique of frequency spectrum analysis requires utilization of a superheterodyne receiver which is tuned or scanned over a surveillance band by varying the frequency of the local oscillator of the receiver over an appropriate frequency band, and plotting the capture times of victim signals during a scanning cycle of the frequency of the local oscillator. Such systems require that the local oscillator frequency be scanned over a frequency bnad as wide as the frequency spectrum under surveillance. The intermediate amplifier of the receiver requires a bandwidth properly proportioned to the rate of scan of the local oscillator frequency in cps per second and calculation indicates that wide band systems require a wide band $i$-$f$ amplifier if scan is to be rapid, or a slow scan rate if good resolution between adjacent frequencies is to be accomplished.

Conventional frequency scanning systems may be considered to function as devices for measuring times in a scanning period at which signals are received. Conventional frequency scanning systems are particularly valuable in analyzing bands of frequencies having multiple signals simultaneously and continuously present. Where pulsed signals are to be captured, and especially where single pulses or short bursts of pulses are to be captured, the fact that such conventional systems are receptive to only a relatively small frequency increment at any given time reduces the probability of capture radically. This is the case because the system may be tuned to receive essentially one frequency at a given instant and precisely at that instant a signal may appear at a different frequency and may subsist for only a short time. For example, a spectrum under examination may be 1,000. mc wide and pulses at random frequencies may occur therein having durations of of 0.1 microseconds. If resolution of perhaps 10 mc is required in a conventional scanning spectrum analysis, the probability of pulse capture becomes extremely low because the scan rate is limited by the resolution required and by the total band scanned to a value far lower than would permit completion of a scan, or even of a considerable portion of a scan, during the pulse.

A further problem which arises in frequency scanning spectrum analyzing systems relates to the total time of a scan in relation to accuracy of frequency measurement. When the total scan time is long, problems of time measurement exist which are ameliorated for shorter times of scan. According to the present invention, time elapse measurements required to measure a frequency may be radically reduced despite the fact that long time elapses per scan are employed.

In a simplified embodiment of the present invention, two conventional frequency scanning spectrum analyzers are employed, each of which scans at a slightly different rate in cps per second. Assuming a single frequency to exist for a considerable time within a given frequency spectrum, that frequency is captured, in general, at different times by the two analyzers. It can then be shown that the frequency in question may be measured in terms of any one of three different time elapses; i.e., the time elapse from initiation of a scan to capture of the frequency, in either receiver, or the difference between times of capture of the frequency in both receivers. The latter time may be made extremely small by providing a relatively small difference in the rates of scan employed.

Such a system, nevertheless, requires that each spectrum analyzer scan over the entire frequency band of interest. Accordingly, while frequency may be measured in terms of a short time elapse despite the fact that the total scan time is long, the probability of capture of a single short pulse is not increased over the probabilities existent in conventional systems.

In accordance with a modification of the present invention, two or more frequency scanning spectrum analyzers are employed which possess different scan rates. The scanning local oscillators of the analyzers are harmonic local oscillators, i.e., they provide each a plurality of harmonically related local oscillator frequencies which are simultaneously applied to the mixer of the analyzer.

Any incoming signal in a single analyzer may combine with any one of a set of harmonically related local oscillations to produce a desired $i$-$f$ frequency, instead of being restricted to combination with a single local oscillation, and hence if the scan of the analyzer takes place over a frequency range equal only to the spacing of two adjacent local oscillator frequencies, an incoming pulse signal must be captured if the scan time, which may be quite brief, is less than a pulse duration. Scan time can thus be radically reduced by utilizing the described harmonic local oscillator technique. By employing two analyzers having harmonic local oscillators, and by scanning both at different rates, the time elapse between capture times in the two analyzers indicates frequency position, but only in quantized fashion, since the signal is localized only by being located at some unknown position within a frequency band which is equal in width to the spacing of two adjacent local oscillator frequencies. In effect, what is further required is to determine which local oscillator frequency of those made available by a harmonic local oscillator in fact converted a received pulse to $i$-$f$ frequency. To determine this without uncertainty of ambiguity, the harmonic local oscillators employed in the separate analyzers have spacings between adjacent frequencies which are different, and total numbers of harmonics employed in the several harmonic oscillators are relatively prime, but are both so selected as to precisely cover a surveillance band. For example, ten equally spaced local oscillator frequencies may cover a desired band in one analyzer, and eleven in another, of a two-analyzer system. It may then be shown, employing congruence algebra, that the time elapse between captures of a given signal by the two analyzers is uniquely determinative of the gross frequency of the signal, i.e., that this time elapse indicates which local oscillator frequency effected conversion.

All local oscillator frequencies are scanned in synchronism, and the time elapse between initiation of a scan and capture of a signal in either signal analyzer is indicative of fine frequency position of the signal within a band equal in extent to the spacing between adjacent local oscillator frequencies. Each capture of a signal is accompanied by or involves two time measurements, one of which indicates gross frequency position of the signal, and the other of which represents fine frequency position of that signal. Stated in another way, a surveillance band is divided into cells, on a gross basis, and one time measurement identifies the cell within which a signal falls, while the remaining time measurement localizes the signal within the cell.

It is, accordingly, a broad object of the present invention to provide a system for measuring frequency by measuring difference of times of capture of the frequency by a plurality of scanning spectrum analyzers having different scan rates.

It is a further broad object of the present invention to provide a system of measuring frequency by means of a frequency scanning superheterodyne receiver employing a frequency scanning harmonic local oscillator.

A further object of the invention resides in the provision of a system for measuring frequency within a band in which at least two frequency scanning systems are provided, each employing multiple simultaneous scans over adjacent sub-bands or cells of the band, the sub-bands or cells for the different scanning systems being of different extent, and the scanning rates being proportional to the cell widths, the frequency being measured in terms of time difference of capture times of the signal by the separate scanning systems.

It is a further object of the present invention to provide a system for generating two time measurements, one representative of gross frequency of a signal, and the other representative of fine frequency of the signal.

Another object of the invention resides in the provision of a system for obtaining a gross measurement of frequency, by means of two harmonic frequency scanners employing different scan rates.

The above and still further objects, features and advantages of the present invention will become apparent upon consideration of the following detailed description of one specific embodiment thereof, especially when taken in conjunction with the accompanying drawings, wherein.

Figure 1:
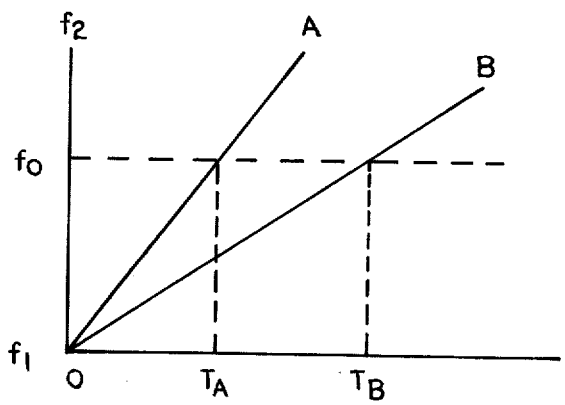
FIG. 1 is a plot of scanning frequency against time, involving two different rates of frequency scan.

Referring now more particularly to FIG. 1 of the accompanying drawings, there is illustrated two plots of frequency against time having different linear rates of scan, curve A indicating a faster rate of change of frequency with time than does curve B. Assume time increases from 0 time, and that frequency is $f_1$ at zero time and $f_2$ at some later time. Curve A attains a victim frequency $f_o$ at time $T_A$ and curve B at some different time $T_B$. $T_B - T_A$ is then uniquely representative of the spacing of frequency $f_o$ from $f_1$.

It may be noted that in FIG. 1 both scans are linear and are initiated simultaneously from a common reference value. FIG. 1 then indicates a special case, which involves extreme simplification of conditions. In fact, the scans may be non-linear, and may be initiated at different times and/or at different starting frequencies. Knowing the parameters involved, i.e., the laws governing scan rates, and the initial conditions, the value of $f_o$ may be calculated for any set of values of $T_B$ and $T_A$. The generalized case is not particularly treated herein.

Figure 2:
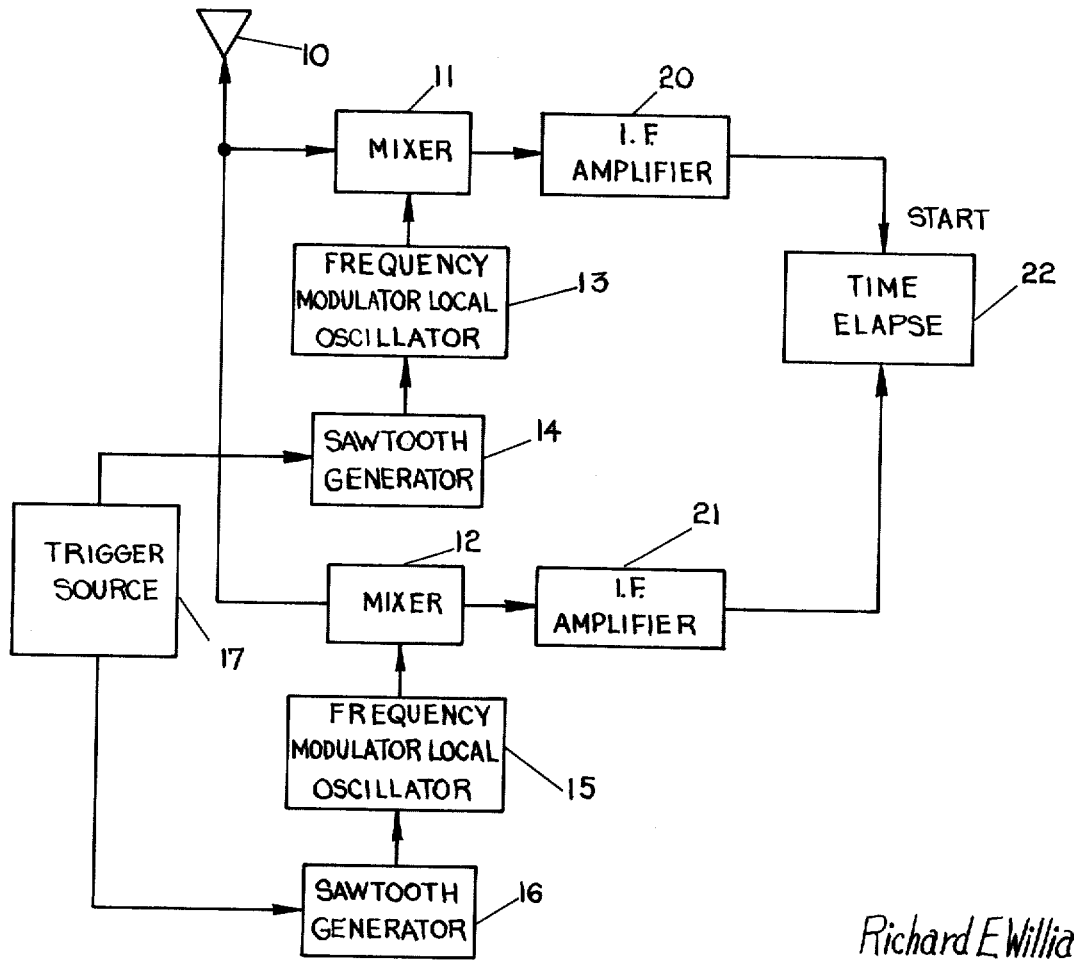
FIG. 2 is a block diagram of a system frequency scanning spectrum analysis employing two analyzers having different scan rates.

In FIG. 2 is illustrated a system for measuring frequency by measuring time elapse $T_B - T_A$. Antenna 10 is a signal source and applies signals to two mixers, 11 and 12, in parallel. Mixer 11 is associated with a frequency modulatable oscillator 13, the frequency of which is modulated linearly in response to a sawtooth voltage wave provided by source 14. Similarly, mixer 12 is associated with a frequency modulatable local oscillator 15, the frequency of which is modulated linearly by a source 16. Source 14 effects a frequency scan of the local oscillator 13 according to curve A of FIG. 1, and source 16 effects a frequency scan of local oscillator 15 according to curve B, both scans originating at frequency $f_1$ and at time 0 in response to a trigger voltage generated by trigger source 17.

The output of mixer 11 is applied to i.f. amplifier 20 and the output of mixer 12 to i.f. amplifier 21, the band widths and center frequencies of which may be substantially the same and selected to provide required resolution of frequencies at the scan rates involved.

The outputs of i.f. amplifiers 20 and 21 are applied, respectively, as "start" and "stop" signals to a time elapse measuring device 22 of conventional character, per se.

In operation, and to simplify the explanation, we assume a single frequency to be continuously received by antenna 10. Trigger source 17 simultaneously initiates scans of sawtooth generators 14 and 16, each of which scans at a different rate. In the course of the scan, since sawtooth generator A scans at a more rapid rate (curve A, FIG. 1) than sawtooth generator B (curve B, FIG. 1), i.f. amplifier 20 captures the incoming signal before i.f. amplifier 21 and the respective times of capture are $T_A$ and $T_B$. The signal captured at time $T_A$ by i.f. amplifier 20 transfers a short pulse to time elapse measuring device 22 to start a time elapse measurement. The signal captured at time $T_B$ by i.f. amplifier 21 transfers a stop pulse to time elapse measurement device 22 to stop the time elapse measurement and observation of the results of the measurement provides an indication of the value of frequency $f_o$.

It is nevertheless a fact that each of the scanning spectrum analyzers of FIG. 1 is required to scan the entire band within which $f_o$ may occur and that, in consequence, certainty of capture requires that at least some portion of the signal subsist during the entire scan. The system of FIG. 2 is not, therefore, appropriate for receiving single short pulses where the surveillance band is wide.

Figure 3:
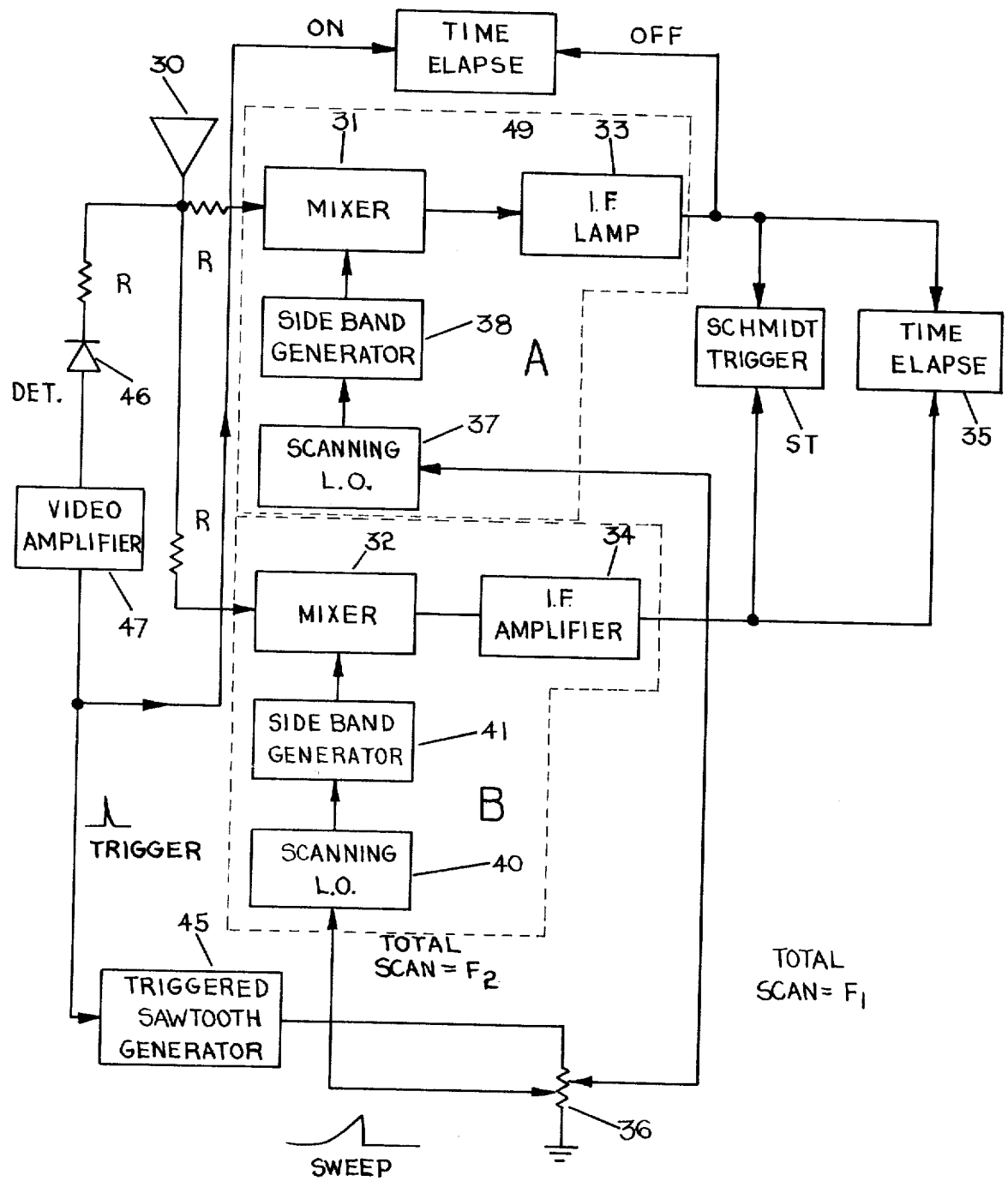
FIG. 3 is a block diagram of a frequency scanning system employing two frequency scanners having different scan rates, and employing harmonic scanning local oscillators.

In the system of FIG. 3 a signal source 30, specifically an antenna, applies signal in parallel to two parallel mixers, 31 and 32, (via isolating resistances R) pertaining to scanning spectrum analyzers A and B. The mixers 31, 32 issue, respectively, into i.f. amplifiers 33, 34 and the outputs of the latter are employed to start and stop a time elapse measuring device, 35.

A frequency modulated local oscillator 37 is caused to scan over a desired frequency band in response to signal derived across a portion of a voltage divider 36. The output of local oscillator 37 is modulated with the output of a harmonic local oscillator in a side band generator 38, and the output of the latter is applied to mixer 31. Similarly, a frequency modulated local oscillator 40 is caused to scan over a desired frequency band in response to signal derived across a different portion of voltage divider 36. The output of local oscillator 40 is modulated with the output of a harmonic local oscillator in a side band generator 41 and the output of the latter is applied to mixer 32.

The modulating voltage available across voltage divider 36 derives from a triggered sawtooth generator or sweep circuit 45, which is triggered from an input pulse on antenna 30. Such pulses are detected in detector 46 and the detected pulse amplified in video amplifier 47, the output of which is applied to trigger the sweep circuit 45 on rise or initiation of the pulse.

An incoming pulse, accordingly, at its leading edge serves to initiate a sweep of sweep circuit 45. It may be assumed, for the sake of example, that side-band generator 38 generates frequencies separated by $F_1$ and side-band generator 41 frequencies separated by $F_2$. The frequencies $F_1$ and $F_2$ are not arbitrarily selected but are selected pursuant to choice of a frequency band $S$ to be observed. The frequency $F_1$ is selected so that $nF_1 = S$, and $F_2$ so that $mF_2 = S$, where $n$ and $m$ are relatively prime. The output of harmonic local oscillator 38 then contains frequencies $X_1 \pm a F_1$, where $a$ is a series of integers and $X_1$ is the frequency provided by generator 37; and the output of harmonic local oscillator 41 contains frequencies $X_2 \pm a F_2$, $a$ having the significance herein indicated, and $X_2$ being the frequency of local oscillator 40.

The output of one of the analyzers, say A, is applied as an OFF pulse to a time elapse measuring device 49 of conventional character, the ON pulse being supplied by the output of video amplifier 47.

A simple explanation of the operation of the present system is now provided, which will be followed by a more intensive explanation based on a mathematical analysis. Briefly, the scan of both oscillators extends over only the distance between two local adjacent oscillator frequencies, in each of analyzers A and B. The time of capture of a given signal by the separate analyzers is generally not the same, and in fact cannot be the same, unless the victim frequency equals the first harmonic local oscillator frequency, or the last, i.e., subsists precisely at an edge of the surveillance band. In the course of a scan, then, the analyzers A and B capture the victim frequency in succession. It can then be shown that, if the local oscillator frequencies be considered to separate the surveillance band into cells, the particular cell in which the victim signal appears is represented by the elapse of time between captures by the separate analyzers, as measured by device 35, regardless of position of the signal within the cell. Position within the cell is indicated by elapse of time between scan initiation and signal capture in either analyzer, as measured by device 49.

We specify the mathematical implications of the present system in greater detail, assuming an exemplary surveillance band of 7,000. to 14,000. mcps, a required accuracy of frequency measurement of 100. mcps. and a requirement that a single victim pulse, of 0.25 μsec duration be captured.

In order to assure capture when employing a single analyzer, or in the absence of harmonic local oscillators, the band 7,000. to 14,000. mcps must be swept in 0.25 μsec. requiring a sweep rate of 28,000. mcps/μsec. The required accuracy of measurement implies a dwell within a measurement cell, 100 cps. wide, of approximately 0.003 μsec. But this dwell implies a pulse width for a measurement cell of 300. mcps. which contradicts the accuracy requirement. In general, feasible sweep rates and measurement accuracies are circumscribed, for a single analyzer conventional scan system, by the expression $$(1) \quad (df_o)^2 \gg (df/dt)$$

where $df_o$ = width of measuring cell in mcps.
$(df/dt)$ = sweep rate in mcps/μsec.
This inequality yields the impossibility $$(2) \quad (\cdot 100)^2 \gg 28,000.$$

when the assumed values are substituted in equation (1). The assumed requirements are therefore not feasible in a system corresponding with FIG. 1 of the accompanying drawings, although reduced requirements may be feasible.

Figure 4:
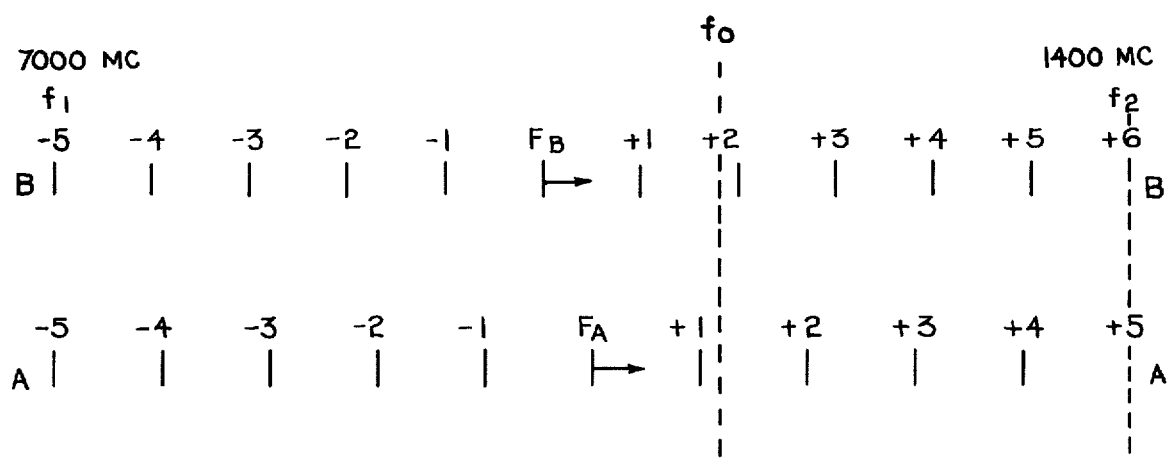
FIG. 4 is a plot of frequency positions of local oscillators, and incoming signals, pertaining to the system of FIG. 3.

In the system of FIG. 3 the total sweep is reduced in accordance with the total number of harmonics employed. It has been found readily feasible to generate five pairs of side bands, with spacings of hundreds of megacycles, in the X band. Equation (1) indicates that the above stated requirements can be met by employing a carrier with five side band pairs, the spacing of adjacent harmonic frequencies being then 7,000/11 ≈636. mcps. If oscillator 37 is so modulated, the output presented to mixer 31 consists of a spectrum B—B (FIG. 4).

Oscillator 37 will require frequency sweep of approximately 636. mcps/0.25μs., or 2,544 mcps/μsec. to scan the surveillance band in 0.25μsec., and since the sweep is triggered by the leading edge of an incoming pulse, the entire spectrum B—B may be assumed to move to the right through a distance of one cell, in 0.25μsec.

The harmonic spacing provided by side-band generator 41 may be 7,000/10 mcps., there being ten harmonics within the surveillance band. The sweep rate is then set to equal 700 mcps/0.25 μs — 2,800 mcps/μs., so that the total surveillance band is again swept in 0.25μsec.

It is of primary importance that the two analyzers employed divide the band into different numbers of segments, so that the segments are of different widths. However, the specific values above recited are exemplary only, and are selected to meet the requirements of a specific problem. It is further necessary that the number of segments or cells employed, hereinafter sometimes termed the moduli of the system, following the vocabulary of congruence algebra be relatively prime. The number of cells in the example selected, 10 and 11, are relatively prime.

It may be shown, employing congruence algebra, that the frequency $f_o$ can be derived from the following equation $$(3) \quad f_o - f_1 = B[d(fB)/dt] (T_B - T_A) \bmod. BS_B$$

where
$f_o$ = incoming or victim frequency in mc
$f_1$ = lower limit of surveillance band
$B$ = number of sideband intervals or cells in range B—B
$(dF/dt)$ = sweep rate of local oscillator frequencies
$T_B$ = time from sweep start to B intercept
$T_A$ = time from sweep start to A intercept $S_B$ = side band interval in the B band in mc.

Since $BS_B$ = the surveillance band, there are no redundancies or ambiguities within the band. If $(dB/dt)$ is linear the value of $f_o$ is a linear function of time, i.e., is proportional to $T_B - T_A$.

It is required that $T_A$ be smaller than $T_B$, so that $T_B - T_A$ shall be positive. If $T_B$ occurs first a complementary frequency reading will be obtained. Provision for this possibility is mentioned hereinafter.

It will be noted that the value $T_B - T_A$ can be quantized, i.e., can have any one of ten values depending on the cell within the surveillance band within which $f_o$ is found. The maximum value of $T_B - T_A$ is 0.25µs, so that a measurement to within 0.025µs is required. In addition, we may measure $T_A$ on a quantized basis, to one part in ten. Since (4)  $f_o (\text{mod} T_A) = (df_A/dt) T_A + f_1$ the last-mentioned time measurement determines the frequency position within any one cell, and may be assumed accurate to one part in ten. Knowing both the cell within which $f_o$ occurs, and the position within the cell, each to one part in 10, the absolute value of $f_o$ is known, to an accuracy of one part in 100.

Referring more particularly to FIG. 4 of the accompanying drawings, there is shown a band of frequencies, B—B or A—A. The band B—B is divided into 11 cells, the boundaries of which are counted off in the Figure, $F_B$ being the carrier about which side bands are developed and with respect to which sidebands are counted in the Figure, and which is frequency modulated in order to effect scan of the side-bands. Similarly, the band A—A is divided into ten cells, the boundaries of which are counted off in the Figure, the carrier being $F_A$. The limits of bands A—A and B—B are identical and if desired may be maintained identical by AFC devices (not illustrated). The arrows attached to $F_A$ and $F_B$ indicate the direction of scan, and i.f. frequency band involved may be assumed to be a video and, for simplification of exposition, so that the victim frequency $f_o$ may be assumed to be within the band A—A, or B—B, and so that it may be further assumed that an i.f. signal will be generated when coincidence occurs between the victim frequency $f_o$ and a side band frequency, among which are included the frequencies $F_A$ and $F_B$. Obviously, other i.f. frequencies may be employed without departing from the principles of the invention.

The frequency $f_o$ being assumed stationary, and the side bands being assumed to move to the right, coincidence of the frequency $f_o$ with some one of the A—A side bands, and with some one of the B—B side-bands is assured in the course of one scan over a frequency range equal to the difference between two adjacent side-bands. The frequency separation between any A—A and B—B side-bands which are of corresponding identification number, is, however, a linear function of the frequency $f_o$, since side-bands A—$A_{-5}$ and B—$B_{-5}$ are identical in frequency. A—$A_{-4}$ and B—$B_{-4}$ are slightly separated, say by $\Delta f$. AA$_{-3}$ and BB$_{-B}$ are separated by 2 $\Delta f$, and so on.

It follows that $f_o$ is translated to a time elapse by the scanning process, i.e., that a measurement of the time difference of capture of $f_o$ in the two analyzers A and B can be used to quantize the value of $f_o$ on a gross basis, to one part in ten, i.e., to identify which of the side bands converted $f_o$ to the i.f. frequency, or, conversely, identify the cell within which $f_o$ occurred.

The position of the frequency $f_o$ within a cell may readily be measured by measuring the time from initiation of a scan to time of capture. The two times together, then, provide a code which identifies the frequency both as to position within a cell, and as to position of the cell. Assuming accuracy of one part in 10 for each time measurement, the accuracy of the measurement is to one part in 100.

When all possible values of $f_o$ within band B—B are considered, it is found that sometimes an A—A sideband will be captured before a B—B side-band, and that at other times the reverse will be true. This gives rise to ambiguity. To resolve the ambiguity, a Schmidt Trigger Circuit ST is connected to the outputs of the i.f. amplifiers 33, 34, so that the first pulse incoming will trigger the Schmidt circuit to one or another condition, depending on point of origin. One condition will then indicate that time elapse is to be read directly, and the opposite state that the complement of the reading is to be taken. In the alternative, the total scan may be extended over two cells, and the time elapse devices so selected that measurements commence only in response to a pulse from the A analyzer, and terminate only in response to a pulse from the B analyzer.

While the intermediate frequencies may be selected as convenient, it has been suggested that video, i.f.'s be employed. This selection has a particular value in that as a local oscillator frequency scans through a received pulse, first one (say an upper) set of conversion products passes through the i.f. filter, and then the other (say the lower). The total pulse time in the i.f. filter is thus doubled, permitting a filter of half the expected band-width to be employed, or permitting the scan time to be halved for a given i.f. filter band-width.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A system of frequency measuring comprising a first frequency scanning system for capturing a predetermined frequency at a time within a first time interval wherein said time is a function of said frequency, and a second predetermined frequency scanning system for capturing said predetermined frequency at a time within a second time interval which is a function of said predetermined frequency, and means for indicating the value of said predetermined frequency as a function of the difference of said times.

2. In a system for measuring, means for converting a frequency into a first time position within a time interval of first extent, wherein said first time position is a function of said frequency, means for converting said frequency value into a time position within a second time interval of second extent, wherein said second time position is a function of said frequency, and means for indicating the value of said frequency as a difference of said time positions.

3. In a spectrum analyzer, a source of victim signal within a surveillance band, a first mixer, a second mixer, a first harmonic local oscillator, a second harmonic local oscillator, a first intermediate frequency amplifier coupled to said first mixer, a second intermediate frequency amplifier coupled to said second mixer, said first harmonic local oscillator having a first frequency spacing between harmonic frequencies, said second harmonic local oscillator having a different frequency spacing between harmonic frequencies, means for applying said victim signal to said first and second mixers, means for coupling said first harmonic local oscillator to said first mixer, means for coupling said second harmonic local oscillator to said second mixer, said first harmonic local oscillator providing n oscillations of frequencies $F_1, F_2 \ldots F_n$, extending over said surveillance band, said second harmonic local oscillator providing m oscillations of frequencies $F_a, F_b \ldots F_m$ extending over said surveillance band, m and n being relatively prime integers and means for so scanning said first local oscillator over a band equal to $F_2 - F_1$ and said second local oscillator over a band $F_b - F_a$ that said scans occupy equal times.

4. The combination according to claim 3, wherein is further provided means for measuring the time elapse between capture of said victim signal by said first and second intermediate frequency amplifiers.

5. The combination according to claim 4, wherein is further provided means for measuring the time elapse between start of a scan and capture of said victim signal.

6. A system of measuring frequency of a victim signal within a surveillance band by frequency scanning which includes, means including a plurality of frequency scanning systems each arranged to frequency scan over a portion of said surveillance band which is less than the extent of said band divided by the number of said frequency scanning systems, the extent of frequency scan of each of said frequency scanning systems being different, and means for indicating the said frequency of said victim signal as a function of relative capture times of said victim signals by all said frequency scanning systems.

7. In a frequency analyzer for measuring a victim frequency, a source of first harmonically related oscillations of frequency separation $F_x$, a source of second harmonically related oscillations of frequency separation $F_y$, where $F_x \neq F_y$, means for simultaneously scanning said first harmonically related oscillations each over a frequency band of extent $F_x$, means for simultaneously scanning said second harmonically related oscillations each over a frequency band of extent $F_y$, means for completing all said scans in a time T, and means for detecting occurrence of a predetermined frequency relation between said victim frequency and the frequencies of one of each of said first and second harmonically related oscillations in the course of said scan.

8. The combination according to claim 7, wherein said frequency relation is equality.

9. The combination according to claim 7, wherein the ratio of $(F_x/F_y)$ is a rational number.

10. The combination according to claim 7, wherein the surveillance band is $f_2 - f_1$, and where $(f_2-f_1/F_x)$, and $(f_2-f_1/F_y)$ are both integers, and wherein said integers are relatively prime.

11. The combination according to claim 10, wherein $(f_2-f_1/F_x) 1 = (f_2-f_1/F_y)$.

12. In a system for measuring a victim frequency $f_o$ within a surveillance band $f_2 - f_1$, means for generating first frequencies over said surveillance band with spacings $(f_2-f_1/F_x)$ and further frequencies over said surveillance band with spacings $(f_2-f_1/F_y)$, where $F_x \neq F_y$, means for scanning said first frequencies each over a band of extent $F_x$ and said further frequencies each over a band of extent $F_y$, and means for measuring the capture times of said victim frequency $f_o$ by at least one of said first frequencies and by at least one of said further frequencies.

* * * * *